United States Patent
Deligne et al.

(10) Patent No.: US 7,523,034 B2
(45) Date of Patent: Apr. 21, 2009

(54) ADAPTATION OF COMPOUND GAUSSIAN MIXTURE MODELS

(75) Inventors: Sabine V. Deligne, New York, NY (US); Satyanarayana Dharanipragada, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 702 days.

(21) Appl. No.: 10/318,488

(22) Filed: Dec. 13, 2002

(65) Prior Publication Data

US 2004/0117183 A1      Jun. 17, 2004

(51) Int. Cl.
G10L 15/00    (2006.01)
(52) U.S. Cl. .................... 704/251; 704/252; 704/253; 704/255; 704/256; 704/256.1
(58) Field of Classification Search ............ 704/231, 704/251, 252
See application file for complete search history.

(56) References Cited

U.S. PATENT DOCUMENTS

| | | | |
|---|---|---|---|
| 5,864,810 A * | 1/1999 | Digalakis et al. | 704/255 |
| 6,073,096 A * | 6/2000 | Gao et al. | 704/245 |
| 6,389,393 B1 * | 5/2002 | Gong | 704/244 |
| 6,421,641 B1 | 7/2002 | Huang et al. | |
| 6,539,351 B1 * | 3/2003 | Chen et al. | 704/236 |
| 6,662,160 B1 * | 12/2003 | Chien et al. | 704/256 |

OTHER PUBLICATIONS

Xiang et al., Short-time Gaussianization for robust speaker verification, IEEE ICASSP 2002, vol. 1, p. 681-I-684, May 2002.*
A. Sankar et al., A Maximum Likelihood Approach to Stochastic Matching for Robust Speech Recognition, IEEE Transactions Speech and Audio Processing, 4:190-202, 1996.
A.P. Dempster et al., "Maximum-Likelihood from Incomplete Data via the EM Algorithm", Journal of the Royal Statistics Society, pp. 1-38, vol. 39 (1), 1977.
L. Rabiner et al, "Fundamentals of Speech Recognition", Prentice Hall Signal Processing Series, 1993, Chapter 3.

* cited by examiner

Primary Examiner—Richemond Dorvil
Assistant Examiner—Leonard Saint Cyr
(74) Attorney, Agent, or Firm—Ference & Associates LLC

(57) ABSTRACT

Methods and arrangements for enhancing speech recognition in noisy environments, via providing at least one initial Compound Gaussian Mixture model, applying an adaptation algorithm to at least one item associated with speech enrollment data and to the at least one initial Compound Gaussian Mixture model to yield an intermediate output, and mathematically combining the at least one initial Compound Gaussian Mixture model with the intermediate output to yield an adapted Compound Gaussian Mixture model.

15 Claims, 1 Drawing Sheet

ADAPTATION OF COMPOUND GAUSSIAN MIXTURE MODELS

FIELD OF THE INVENTION

The present invention generally relates to speech recognition and its application in noisy environments.

BACKGROUND OF THE INVENTION

Robustness to speaker and environment variability is a crucial issue normally addressed in connection with speech recognition, especially when performance in a real-world environment is concerned. Ideally, one usually likes for speech recognition systems to perform equally well for all speakers and all acoustic environments. For this purpose, the acoustic model in the speech recognition systems is usually trained on a very large collection of speakers and on data collected in various environments. However speaker-independent systems, for example, do not tend to perform as well as speaker-adapted systems. Adaptation usually involves reducing the mismatch between the characteristics of speech features that are specific to a speaker and/or an acoustic environment and the characteristics of an acoustic model trained on general data. It can be done off-line if enrollment data for a specific speaker or environment is available.

Speech features are multi-dimensional vectors. An acoustic model usually includes a set of context-dependent subphone units, each of which is associated to a probability density function (pdf), usually a multi-dimensional Gaussian mixture with diagonal covariances. At run time, i.e. at recognition time, the probability of each input speech feature vector is evaluated with the pdf of each subphone in the model. This operation will be referred to as acoustic scoring. There are essentially two approaches to adaptation: (i) feature space adaptation where the speech feature vectors are transformed to better match the parameters of the model's pdfs, and (ii) model adaptation where the parameters of the model's pdfs are transformed to better characterize the input speech feature vectors.

In feature space approaches, a feature space transform is learnt on the speech features extracted from the enrollment data. At run time, i.e. at recognition time, this transform is applied to the input speech features before they are scored against the acoustic model. A popular feature space adaptation technique is the so-called feature-space MLLR technique, standing for "Maximum Likelihood Linear Regression" (see A. Sankar and C. H. Lee, *A Maximum Likelihood Approach to Stochastic Matching for Robust Speech Recognition*, IEEE Transactions Speech and Audio Processing, 4:190-202, 1996) where a linear transform is estimated by maximizing the likelihood of the enrollment data. In model adaptation approaches, a transform modifying the parameters of the pdfs is learnt on the speech features extracted from the enrollment data. At run time, i.e. at recognition time, the pdfs with modified parameters are used instead of the original pdfs.

Adaptation is made more difficult in the context of speech recognition devices with low resources where particular acoustic scoring schemes are needed to speed up the Gaussian computation while maintaining a low computational complexity. Such schemes commonly involve manipulating quantized and clustered versions of low-dimension Gaussian pdfs instead of the original Gaussian pdfs. In a scheme that is of interest in the context of the present invention, Gaussian components are "sliced" into Gaussians of smaller dimensions called "bands" (for example, Gaussians of dimension 39 can be sliced into bands of dimension 2, resulting into 19 Gaussians of dimension 2 and one Gaussian of dimension 1). The low-dimension Gaussians in each band are clustered into a smaller set of Gaussians called atoms. (By way of further explanation, "atoms" are the low-dimension Gaussian models that result from splicing into bands the original Gaussian models and from clustering these bands. Each atom includes a mean and of a covariance matrix. Each band of each Gaussian in the original Gaussian models is mapped to a specific atom, while bands of different Gaussians can possibly be mapped to the same atom). As will be explained below, a model structured into bands and atoms is formally equivalent to a CGM model.

In the context of an acoustic scoring scheme with clustered pdfs, feature space adaptation techniques offer the advantage over model adaptation techniques to not require to re-cluster the pdfs since feature space techniques affect only the feature vectors. However, feature space techniques involve a significant computational overhead at run time since the input speech features are transformed before acoustic scoring. To date, a model adaptation technique called "MLLR adaptation of atoms", which operates directly on the atoms, has been proposed (see J. Huang and M. Padmanabhan, "Methods and apparatus for fast adaptation of a band-quantized speech decoding system.," U.S. Pat. No. 6,421,641 B1, Jul. 16, 2002). In an MLLR adaptation of atoms, the mean of the atoms undergo a linear transform, while the variance of the atoms are not transformed. Besides all the atoms corresponding to the same band are constrained to undergo the same linear transform.

Another aspect of adaptation in the context of speech recognition devices with low resources is the computational complexity of the adaptation algorithm itself. In general, adaptation algorithms tend to require the computation of statistics from the enrollment data and computation of the new model parameters from these statistics. For devices with low resources, it is important that these two steps do not demand large resources, computational as well as memory. In this regard, both the feature space transformation technique and the MLLR adaptation of atoms are unsuitable.

In view of the foregoing, a need has been recognized in connection with overcoming the shortcomings and disadvantages of conventional arrangements.

SUMMARY OF THE INVENTION

In accordance with at least one presently preferred embodiment of the present invention, there is broadly contemplated a technique for adapting CGM models. Since atoms are a particular case of CGM model, this technique is well suited to adapt atoms.

The technique has the advantage over feature adaptation techniques to not require any additional computational overhead at run time.

The technique has the following advantages over the MLLR adaptation of atoms: (i) it does not constrain the transform to be linear, (ii) it allows to adapt the mean as well as the variance of the atoms, and (iii) it does not constrain the atoms of a same band to undergo the same transform.

Furthermore, the computational complexity of the adaptation algorithm, i.e., the computation of the statistics and the computation of the new model parameters, is much simpler in the presently contemplated technique when compared to both the MLLR adaptation of atoms and the feature transformation technique.

In summary, one aspect of the invention provides a method of enhancing speech recognition in noisy environments, the method comprising the steps of: providing at least one initial Compound Gaussian Mixture model; applying an adaptation algorithm to at least one item associated with speech enrollment data and to the at least one initial Compound Gaussian Mixture model to yield an intermediate output; and mathematically combining the at least one initial Compound Gaussian Mixture model with the intermediate output to yield an adapted Compound Gaussian Mixture model.

A further aspect of the invention provides an apparatus for enhancing speech recognition in noisy environments, the apparatus comprising: an arrangement for providing at least one initial Compound Gaussian Mixture model; an arrangement for applying an adaptation algorithm to at least one item associated with speech enrollment data and to the at least one initial Compound Gaussian Mixture model to yield an intermediate output; and an arrangement for mathematically combining the at least one initial Compound Gaussian Mixture model with the intermediate output to yield an adapted Compound Gaussian Mixture model.

Furthermore, an additional aspect of the invention provides a program storage device readable by machine, tangibly embodying a program of instructions executable by the machine to perform method steps for enhancing speech recognition in noisy environments, the method comprising the steps of: providing at least one initial Compound Gaussian Mixture model; applying an adaptation algorithm to at least one item associated with speech enrollment data and to the at least one initial Compound Gaussian Mixture model to yield an intermediate output; and mathematically combining the at least one initial Compound Gaussian Mixture model with the intermediate output to yield an adapted Compound Gaussian Mixture model.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENT

Figure 1:
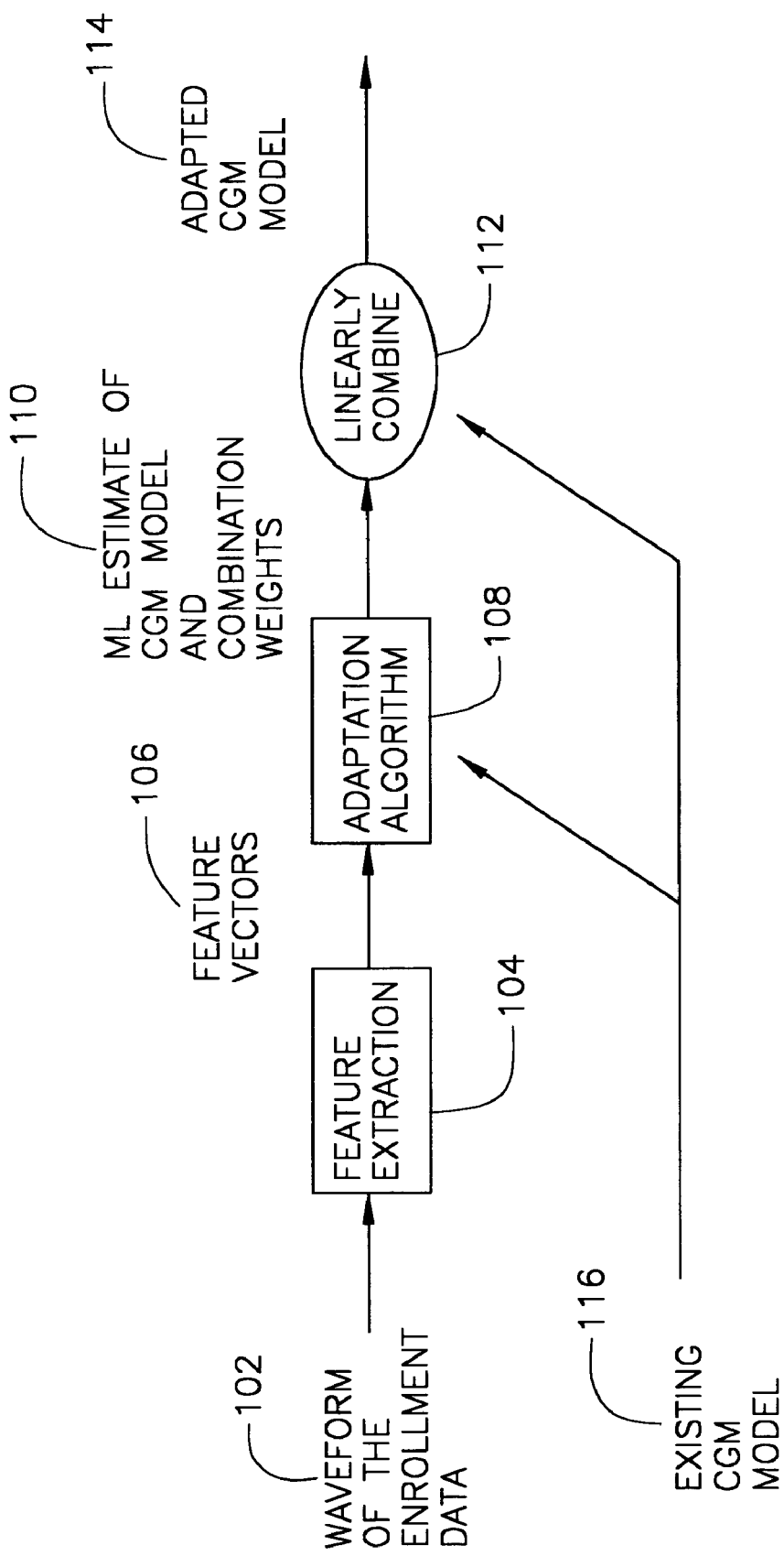
FIG. 1 illustrates a manner via which a CGM model adaptation procedure may produce an adapted CGM model given an existing CGM model and given enrollment data.

FIG. 1 illustrates how a CGM model adaptation procedure produces an adapted CGM model given an existing CGM model and given enrollment data. Generally, as shown, a waveform 102 of enrollment data is preferably submitted to feature extraction 104. Resulting feature vectors 106 are then preferably input into an adaptation algorithm 108. One or more existing, or initial, CGM models 116 is/are applied to the adaptation algorithm 108 as well. A resulting maximum likelihood (ML) estimate of the CGM model and combination weights (110) are then preferably linearly combined at 112 with the existing CGM model(s) to finally yield one or more adapted CGM model(s) 114. Specific details of this technique in accordance with at least one illustrative and non-restrictive embodiment of the present invention are provided herebelow.

CGM models are a generalization of Gaussian Mixture (GM) models with diagonal covariances. In a GM model, the distribution of a D-dimensional random vector is modeled with a mixture of joint Gaussian distributions. In speech applications, in order to limit the number of free parameters, each joint Gaussian distribution component in the mixture is assumed to have a diagonal covariance matrix. Equivalently one can say that for any given $i^{th}$ Gaussian component in the mixture, each $d^{th}$ dimension in the random vector is modeled with a mono-dimensional Gaussian. In a CGM model, for any given $i^{th}$ Gaussian component in the mixture, each $d^{th}$ dimension in the random vector is modeled with a mixture of $K_{i,d}$ mono-dimensional Gaussians. There is considered here a generalized version of CGM model, where for any given $i^{th}$ Gaussian component in the mixture, each $b^{th}$ band made of a subset of $d_b$ dimensions, instead of each $d^{th}$ dimension, is modeled with a mixture of $K_{i,b}$ multi-dimensional Gaussians of dimension $d_b$:

$$\varrho_i \prod_{b=1}^{B} \sum_{k=1}^{K_{i,b}} \pi_{i,b,k} (2\pi\sigma_{i,b,k})^{-\frac{1}{2}} \exp\left(-\frac{1}{2}(X_b(t) - \mu_{i,b,k})\sigma_{i,b,k}^{-1}(X_b(t) - \mu_{i,b,k})^{\#}\right)$$

A CGM model is thus fully defined by the set of parameters $\Theta$:

$$\Theta = \left\{ \left(\varrho_i, \left((\pi_{i,b,k}, \mu_{i,b,k}, \sigma_{i,b,k})_{k=1}^{k=K_{i,b}}\right)_{b=1}^{b=B}\right)_{i=1}^{i=I} \right\}$$

where I is the number of compound Gaussians in the mixture, where $Q_i$ is the prior of the $i^{th}$ component in the mixture, where B is the number of bands, and where $$(\pi_{i,b,k}, \mu_{i,b,k}, \sigma_{i,b,k})_{k=1}^{k=K_{i,b}}$$

are respectively the priors, means and covariance matrices for the $K_{i,b}$ Gaussians of dimension $d_b$ in the Gaussian mixture assumed at the $b^{th}$ band of the $i^{th}$ compound Gaussian. A model made of atoms as described above is thus a particular case of a CGM model where for any given $i^{th}$ Gaussian component in the mixture, any given $b^{th}$ band is modeled with a single Gaussian component, i.e., for any given i and b, $K_{i,b}=1$.

Another generalization of the CGM model is obtained by introducing sharing of the Gaussian components. Sharing can be at different levels as will be explained next. In a speech recognition system each sub-phonetic class is often modeled by a Gaussian Mixture model or a CGM in our case. The D-dimensional components in these CGMs can be shared across different classes, i.e., two or more sub-phonetic classes can have the same D-dimensional Gaussian in their mixture models. This is referred to as sharing at the D-dimensional level. In a CGM we can have sharing at the band-level too, i.e., Gaussian components in the mixture of a given band can be shared across different D-dimensional Gaussians spanning different classes. Here, sharing is essentially ignored throughout the present description of embodiments of the present invention. The equations and steps, can however be easily modified to incorporate sharing.

Consider the set of parameters $\Theta^0$ of an existing CGM model and assume that one wants to compute an adapted set of parameters $\Theta$ given some enrollment data. It is presently proposed to compute $\Theta$ as a linear combination of the CGM parameters $\Theta^0$ and of the CGM parameters $\Theta^{ML}$, where $\Theta^{ML}$ is estimated according to a Maximum Likelihood (ML) criterion on the enrollment data:

$$\Theta = r\Theta^0 + (1-r)\Theta^{ML} \tag{1}$$

Herebelow, there are derived equations to compute $\Theta^{ML}$, an ML estimate of CGM parameters on the enrollment data $Y(1) \ldots Y(t) \ldots Y(T)$ where $Y(t)$ is a D-dimensional vector observed at time t. There will be denoted the $b^{th}$ band $(1 \leq b \leq B)$ of $Y(t)$ as $Y_b(t)$. $Y_b$ is thus a vector of dimension $d_b$ smaller than D. The problem of computing an ML estimate $\Theta$ can be formulated as an ML estimation problem from incomplete data, where the missing data are the gaussian components drawn for each band $Y_b$, and as such it can be solved with an Expectation-Maximization procedure (see A. P. Dempster et al., "Maximum-Likelihood from Incomplete Data via the EM Algorithm", Journal of the Royal Statistics Society, pp 1-38, vol. 39(1), 1977). The complete data are given by (Y, U, Z), where the random variable U is such that $U(t)$ specifies the index i of the compound Gaussian drawn for $Y(t)$, and where the random vector variable $Z = [Z_1 \ldots Z_B]$ is such that $Z_b(t)$ specifies the index k of the Gaussian $(\pi_{\iota,b,k}, \mu_{i,b,k}, \sigma_{\iota,b,k})$ drawn for $Y_b(t)$. The likelihood of the complete data computed with the parameter set $\Theta$ is given by the joint density $p_\Theta(Y, U, Z)$ Following the EM framework, one may define the auxiliary function $Q(\Theta',\Theta)$ to be the conditional expectation of the log-likelihood of the complete data (Y,U,Z):

$$Q(\Theta',\Theta) = E(\log p_\Theta(Y,U,Z) | \Theta', Y) \qquad (2)$$

According to the Baum-Welch inequality, if $Q(\Theta',\Theta) \geq Q(\Theta',\Theta')$ then $P_\Theta(Y) \geq p_{\Theta'}(Y)$. The E-step of the EM procedure consists in computing $Q(\Theta',\Theta)$ and the M-step consists in maximizing $Q(\Theta',\Theta)$ with respect to $\Theta$. The data $Y(t)$ are assumed to be independent over time, so that the loglikelihood can be written as:

$$\log p_\Theta(Y,U,Z) = \sum_{t=1}^{T} \log p_\Theta(U(t)) + \log p_\Theta(Z(t)|U(t)) + \log p_\Theta(Y(t)|U(t), Z(t))$$

Besides, since the B bands of the conditional random vector (Z|U) are independent, and since the B bands of the conditional random vector (Y|U, Z) follow uncorrelated Gaussian distributions, it comes:

$$\log p_\Theta(Y, U, Z) = \sum_{t=1}^{T} \log p_\Theta(U(t)) + \qquad (3)$$
$$\sum_{t=1}^{T} \sum_{b=1}^{B} \log p_\Theta(Z_b(t) | U(t)) +$$
$$\log p_\Theta(Y_b(t) | U(t), Z_b(t))$$

$$\log p_\Theta(Y, U, Z) = \sum_{t=1}^{T} \sum_{i=1}^{I} \delta_{U(t),i} \log \varrho_i + \qquad (4)$$
$$\sum_{t=1}^{T} \sum_{i=1}^{I} \delta_{U(t),i} \sum_{b=1}^{B} \sum_{k=1}^{K_{i,b}} \delta_{Z_b(t),k} *$$
$$\left[ \log \pi_{i,b,k} + \log(2\pi\sigma_{i,b,k})^{-\frac{1}{2}} - \right.$$

$$\left. \frac{1}{2} (Y_b(t) - \mu_{i,b,k}) \sigma_{i,b,k}^{-1} (Y_b(t) - \mu_{i,b,k})^{\#} \right]$$

where the symbol # denotes a vector transposition, where the Kronecker variable $\delta_{U(t),i}$ equals 1 if $U(t)=i$ and equals 0 otherwise, and where the Kronecker variable $\delta_{Z_b(t),k}$ equals 1 if $Z_b(t)=k$ and equals 0 otherwise.

From equations (2) and (4), it comes:

$$Q(\Theta', \Theta) =$$
$$\sum_{t=1}^{T} \sum_{i=1}^{I} u_i(t) \log \varrho_i + \sum_{t=1}^{T} \sum_{i=1}^{I} \sum_{b=1}^{B} \sum_{k=1}^{K_{i,b}} \omega_{i,b,k}(t) * \left[ \log \pi_{i,b,k} - \log(2\pi\sigma_{i,b,k})^{-\frac{1}{2}} - \right.$$
$$\left. \frac{1}{2} (Y_b(t) - \mu_{i,b,k}) \sigma_{i,b,k}^{-1} (Y_b(t) - \mu_{i,b,k})^{\#} \right]$$

Where $u_i(t)$ represents the occupancy probability, i.e. the posterior probability, of the compound Gaussian i at time t, given $Y(t)$ and $\Theta'$:

$$u_i(t) = E[\delta_{U(t),i} | \Theta', Y(t)] = \frac{\varrho'_i \prod_{b=1}^{B} \sum_{k=1}^{K_{i,b}} \pi'_{i,b,k} (2\pi\sigma'_{i,b,k})^{-\frac{1}{2}} \exp\left(-\frac{1}{2}(Y_b(t) - \mu'_{i,b,k})\sigma'^{-1}_{i,b,k}(Y_b(t) - \mu'_{i,b,k})^{\#}\right)}{\sum_{j=1}^{I} \varrho'_j \prod_{b=1}^{B} \sum_{k=1}^{K_{j,b}} \pi'_{j,b,k} (2\pi\sigma'_{j,b,k})^{-\frac{1}{2}} \exp\frac{1}{2}(Y_b(t) - \mu'_{j,b,k})\sigma'^{-1}_{j,b,k}(Y_b(t) - \mu'_{j,b,k})^{\#}} \qquad (5)$$

And where $\omega_{i,b,k}(t)$ represents the occupancy probability, i.e. the posterior probability, of the Gaussian component k at band b of the compound Gaussian i at time t, knowing $Y(t)$ and $\Theta'$:

$$\omega_{i,b,k}(t) = E[\delta_{U(t),i} \delta_{Z_b(t),k} | \Theta', Y(t)] \qquad (6)$$
$$= E[\delta_{U(t),i} | \Theta', Y(t)] E[\delta_{Z_b(t),k} | \delta_{U(t),i}, \Theta', Y(t)]$$
$$= u_i(t) z_{i,b,k}(t)$$

With $$z_{i,b,k}(t) = \frac{\pi'_{i,b,k}(2\pi\sigma'_{i,b,k})^{-\frac{1}{2}} \exp\left(-\frac{1}{2}(Y_b(t) - \mu'_{i,b,k})\sigma'^{-1}_{i,b,k}(Y_b(t) - \mu'_{i,b,k})^{\#}\right)}{\sum_{m=1}^{K_{i,b}} \pi'_{i,b,m}(2\pi\sigma'_{i,b,m})^{-\frac{1}{2}}}$$
$$\exp\left(-\frac{1}{2}(Y_b(t) - \mu'_{i,b,m})\sigma'^{-1}_{i,b,m}(Y_b(t) - \mu'_{i,b,m})^{\#}\right)$$

During the M-step of the EM procedure, we derive estimation equations for the parameters in $\Theta$ by maximizing the auxiliary function $Q(\Theta',\Theta)$ with respect to $\Theta$. Zeroing the derivative of $Q(\Theta',\Theta)$ with respect to $\varrho_\iota$, $\pi_{i,b,k}$, $\mu_{\iota,b,k}$ and $\sigma_{\iota,b,k}$ yields the estimation equations:

$$\varrho_i = \frac{\sum_{t=1}^{T} u_i(t)}{\sum_{j=1}^{I} \sum_{t=1}^{T} u_j(t)} = \frac{\sum_{t=1}^{T} u_i(t)}{T} \qquad (7)$$

-continued $$\pi_{i,b,k} = \frac{\sum_{t=1}^{T} \omega_{i,b,k}(t)}{\sum_{m=1}^{K_{i,b}} \sum_{t=1}^{T} \omega_{i,b,m}(t)} = \frac{\sum_{t=1}^{T} \omega_{i,b,k}(t)}{\sum_{t=1}^{T} u_i(t)} \quad (8)$$

$$\mu_{i,b,k} = \frac{\sum_{t=1}^{T} \omega_{i,b,k}(t) Y_b(t)}{\sum_{t=1}^{T} \omega_{i,b,k}(t)} \quad (9)$$

$$\sigma_{i,b,k} = \frac{\sum_{t=1}^{T} \omega_{i,b,k}(t)(Y_b(t) - \mu_{i,b,k})(Y_b(t) - \mu_{i,b,k})^\#}{\sum_{t=1}^{T} \omega_{i,b,k}(k)} \quad (10)$$

The disclosure now turns to a more developed overview of the adaptation algorithm.

Initialization may be expressed as follows:

$$\Theta' = \Theta^0$$

Iteration k may be derived as follows:

compute ML parameters $\Theta$ according to equations respectively (7), (8), (9), (10), where the posteriors probabilities $u_i(t)$ and $\omega_{i,b,k}(t)$ are computed according to equations respectively (5) and (6).

if the increase of the likelihood function computed with $\Theta$ is bigger than a predefined threshold then proceed to the next iteration with $\Theta' = \Theta$ and k=k+1, otherwise stop iterations and set $\Theta^{ML} = \Theta$.

One may then preferably compute the adapted parameters as a linear combination of $\Theta^0$ and of $\Theta^{ML}$ according to equation (1).

In equation (1), the weight r used to combine the existing parameter set $\Theta^0$ and the ML estimated parameter set $\Theta^{ML}$ is preferably computed so as to reflect the confidence put in each parameter estimate in the set $\Theta^{ML}$: the more reliable an estimate and the more it should contribute in the linear combination, i.e., the lower the weight r should be. The reliability of the estimate for the Gaussian component ($\pi_{\iota,b,k}, \mu_{\iota,b,k}, \sigma_{\iota,b,k}$) can be somehow quantified by the associated posterior probability $\Sigma_{t=1}^{T} \omega_{\iota,b,k}(t)$ computed over the enrollment data, therefore the combination weight r is preferably computed as a smooth function of $\Sigma_{t=1}^{T} \omega_{\iota,b,k}(t)$:

if $\Sigma_{t=1}^{T} \omega_{\iota,b,k}(t) < M$, $$r = \frac{\left(\sum_{t=1}^{T} \omega_{i,b,k}(t)/M\right)^4}{\left(\sum_{t=1}^{T} \omega_{i,b,k}(t)/M\right)^4 + \left(1 - \sum_{t=1}^{T} \omega_{i,b,k}(t)/M\right)^4}$$

Otherwise r=1

In cases where the adapted system is used in noisy environments and where the enrollment data are collected in a non-noisy environment, one can preferably add noise to the enrollment data. The adapted parameters are then estimated on the pool of data including both the original enrollment data and the enrollment data with added noise. The noise can be added to the enrollment data in the waveform domain, and then feature vectors are computed from the waveform with added noise. The noise addition can also be done in the feature space; here, feature vectors could preferably be computed from the noise waveform and are combined with the speech feature vectors of the enrollment data. This latter scheme allows one to save computational resources at the enrollment time since feature vectors do not need to be extracted from the waveform of the enrollment data with added noise. Assume that the feature space is the cepstral space (see Chapter 3 in L. Rabiner and B. H. Juang, "Fundamentals of Speech Recognition", Prentice Hall Signal Processing Series, 1993), where cepstral feature vectors y are computed from the Mel-filtered spectrum yf of the signal as $$y = C \log(yf)$$

where C refers to the Discrete Cosine Transform. The cepstral feature vectors x corresponding to the data with added noise can be computed as:

$$x = y + C \log(1 + \exp(C^{-1}(n-y)))$$

where y and n refer respectively to the cepstral vectors of the original enrollment data and of the noise data, and where $C^{-1}$ refers to the inverse of the Discrete Cosine Transform.

A technique according to the present invention has been evaluated on a task of speaker adaptation with a speech recognition system designed for car environments, i.e., a system designed for a noisy environment. The evaluation was carried out on a set of 193 speakers. The enrollment data included 25 sentences uttered by each speaker in a quiet environment. The test data on which the speech recognition Word Error Rate (WER) was measured included 75 sentences uttered by each speaker in a quiet environment, 100 sentences uttered by each speaker in a car at 30 mph and 100 sentences uttered by each speaker at 60 mph. For each speaker, the enrollment and test data relate to the same recognition application, for example recognition of digits or of addresses or of navigation commands . . . etc.

The baseline WER obtained on the test data without speaker adaptation is 2.82%. The WER obtained when adapting the model on the quiet enrollment data with the present invention is 2.48%. The WER obtained when adapting the model with the present invention on a pool of data comprising the original enrollment data and the enrollment data with 30 mph and 60 mph car noise added is 2.15%, which represents a 24% relative reduction of the baseline WER. It compares favorably with the 2.27% WER obtained when adaptation is done with the feature space MLLR technique using the same pool of quiet and noise-added adaptation data. Besides, further reduction of the WER, down to 1.99%, can be obtained by combining the present invention with the feature space MLLR technique (the model parameters are adapted after applying an FMLLR transform to the feature vectors.).

It is to be understood that the present invention, in accordance with at least one presently preferred embodiment, includes an arrangement for providing at least one initial Compound Gaussian Mixture model, an arrangement for applying an adaptation algorithm to at least one item associated with speech enrollment data and to the at least one initial Compound Gaussian Mixture model, and an arrangement for mathematically combining the at least one initial Compound Gaussian Mixture model with the intermediate output. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of enhancing speech recognition in noisy environments, said method comprising the steps of:
    providing at least one initial Compound Gaussian Mixture model comprising a formally equivalent model structured into parameters comprising atoms, wherein Gaussian components are sliced into Gaussian components of smaller dimension termed bands, said bands being clustered into atoms;
    applying an adaptation algorithm to compute an adapted set of parameters to be utilized in an adapted Compound Gaussian Mixture model using enrollment data of a speaker;
    wherein said adaptation algorithm comprises:
        computing an adapted set of parameters given enrollment data of a speaker via linear combination of (1) an initial set of parameters and (2) an estimated set of parameters, said estimated set estimated via calculating a maximum likelihood estimate according to a maximum likelihood criterion on the enrollment data;
    wherein the adaptation algorithm involves reducing mismatch between characteristics of speech data that are specific to a speaker in an acoustic environment and characteristics of the initial Compound Gaussian Mixture model trained on general speech data; and
    wherein a processor is used to construct the adapted Compound Gaussian Mixture model to enhance speech recognition in the noisy environment.

2. The method according to claim 1, wherein said adaptation algorithm allows an adaptation of a mean and a variance of the atoms and does not constrain atoms of a same band to undergo a same transform.

3. The method according to claim 2, wherein the adaptation algorithm further comprises at least one combination weight.

4. The method according to claim 3, wherein said combination weights are generally inversely proportional to a confidence measure associated with the estimated set of parameters.

5. The method according to claim 2, wherein said adaptation algorithm further comprises performing an expectation-maximization procedure in yielding the estimated set of parameters.

6. The method according to claim 1, further comprising the steps of:
    obtaining speech enrollment data; and
    performing a feature extraction on the speech enrollment data to yield feature vectors, wherein said feature vectors are used in computing the adapted set of parameters.

7. The method according to claim 1, further comprising the steps of:
    obtaining speech enrollment data; and
    adding noise for speech enrollment data collected in at least one non-noisy environment.

8. An apparatus for enhancing speech recognition in noisy environments, said apparatus comprising:
    an arrangement for providing at least one initial Compound Gaussian Mixture model comprising a formally equivalent model structured into parameters comprising atoms, wherein Gaussian components are sliced into Gaussian components of smaller dimension termed bands, said bands being clustered into atoms;
    an arrangement for applying an adaptation algorithm to compute an adapted set of parameters to be utilized in an adapted Compound Gaussian Mixture model using enrollment data of a speaker;
    wherein said adaptation algorithm comprises:
        computing an adapted set of parameters given enrollment data of a speaker via linear combination of (1) an initial set of parameters and (2) an estimated set of parameters, said estimated set estimated via calculating a maximum likelihood estimate according to a maximum likelihood criterion on the enrollment data;
    wherein the adaptation algorithm involves reducing mismatch between characteristics of speech data that are specific to a speaker in an acoustic environment and characteristics of the initial Compound Gaussian Mixture model trained on general speech data; and
    wherein a processor is used to construct the adapted Compound Gaussian Mixture model to enhance speech recognition in the noisy environment.

9. The apparatus according to claim 8, wherein the adaptation algorithm allows an adaptation of a mean and a variance of the atoms and does not constrain atoms of a same band to undergo a same transform.

10. The apparatus according to claim 9, wherein the adaptation algorithm further comprises at least one combination weight.

11. The apparatus according to claim 10, wherein said combination weights are generally inversely proportional to a confidence measure associated with the estimated set of parameters.

12. The apparatus according to claim 9, wherein said arrangement for applying an adaptation algorithm is adapted to perform an expectation-maximization procedure in yielding the estimated set of parameters.

13. The apparatus according to claim 8, further comprising:
    an arrangement for obtaining speech enrollment data; and
    an arrangement for performing a feature extraction on the speech enrollment data to yield feature vectors, wherein said feature vectors are used in computing the adapted set of parameters.

14. The apparatus according to claim 8, further comprising:
    an arrangement for obtaining speech enrollment data; and
    an arrangement for adding noise for speech enrollment data collected in at least one non-noisy environment.

15. A program storage device readable by machine, tangibly embodying a program of instructions executable by the machine to perform method steps for enhancing speech recognition in noisy environments, said method comprising the steps of:
    providing at least one initial Compound Gaussian Mixture model comprising a formally equivalent model structured into parameters comprising atoms, wherein Gaussian components are sliced into Gaussian components of smaller dimension termed bands, said bands being clustered into atoms;

applying an adaptation algorithm to compute an adapted set of parameters to be utilized in an adapted Compound Gaussian Mixture model using enrollment data of a speaker;

wherein said adaptation algorithm comprises:
  computing an adapted set of parameters given enrollment data of a speaker via linear combination of (1) an initial set of parameters and (2) an estimated set of parameters, said estimated set estimated via calculating a maximum likelihood estimate according to a maximum likelihood criterion on the enrollment data;

wherein the adaptation algorithm involves reducing mismatch between characteristics of speech data that are specific to a speaker in an acoustic environment and characteristics of the initial Compound Gaussian Mixture model trained on general speech data; and wherein a processor is used to construct the adapted Compound Gaussian Mixture model to enhance speech recognition in the noisy environment.

* * * * *